(12) United States Patent
McQuirk

(10) Patent No.: US 8,714,432 B2
(45) Date of Patent: May 6, 2014

(54) APPARATUS FOR AND METHOD OF BRAZING ALUMINIUM PRODUCTS WITH CLOSED LOOP CONVEYOR WITHIN THE FURNACE

(75) Inventor: Malcolm Roger McQuirk, Streetly (GB)

(73) Assignee: AFC-Holcroft, Wixom, MI (US)

( * ) Notice: Subject to any disclaimer, the term of this patent is extended or adjusted under 35 U.S.C. 154(b) by 0 days.

(21) Appl. No.: 13/641,317

(22) PCT Filed: Apr. 11, 2011

(86) PCT No.: PCT/GB2011/000554
§ 371 (c)(1),
(2), (4) Date: Nov. 16, 2012

(87) PCT Pub. No.: WO2011/128624
PCT Pub. Date: Oct. 20, 2011

(65) Prior Publication Data
US 2013/0062399 A1    Mar. 14, 2013

(30) Foreign Application Priority Data
Apr. 14, 2010   (GB) .................................. 1006159.6

(51) Int. Cl.
*B23K 37/00* (2006.01)
*B23K 31/02* (2006.01)
(52) U.S. Cl.
USPC .................................. 228/33; 228/43; 228/46
(58) Field of Classification Search
None
See application file for complete search history.

(56) References Cited

U.S. PATENT DOCUMENTS

| | | | |
|---|---|---|---|
| 3,451,114 A | | 6/1969 | Werneke |
| 3,858,319 A | * | 1/1975 | Stokes et al. .................. 228/223 |
| 4,139,143 A | * | 2/1979 | Gumprecht ................ 228/180.1 |
| 4,211,319 A | * | 7/1980 | Pulver et al. .................. 198/432 |
| 5,158,224 A | * | 10/1992 | Baker et al. ..................... 228/37 |
| 5,289,968 A | | 3/1994 | Maeda et al. |
| 5,560,537 A | * | 10/1996 | Sadler et al. .................. 228/102 |
| 5,797,539 A | * | 8/1998 | Wilde et al. ................ 228/180.1 |
| 5,971,249 A | * | 10/1999 | Berkin .......................... 228/102 |
| 5,993,500 A | * | 11/1999 | Bailey et al. .................. 55/385.6 |
| 6,386,422 B1 | * | 5/2002 | Cheng et al. .................... 228/46 |
| 6,446,855 B1 | * | 9/2002 | Rich ................................ 228/19 |
| 2001/0055740 A1 | * | 12/2001 | Bloom et al. ................. 432/247 |
| 2007/0023481 A1 | * | 2/2007 | Heeb et al. ..................... 228/101 |
| 2007/0284408 A1 | * | 12/2007 | Asai et al. ....................... 228/42 |
| 2009/0236402 A1 | | 9/2009 | Willenegger et al. |

FOREIGN PATENT DOCUMENTS

| | | |
|---|---|---|
| CN | 2091440 U | 12/1991 |
| CN | 201209154 Y | 3/2009 |
| CN | 201333581 Y | 10/2009 |
| DE | 2152244 A1 | 5/1973 |

(Continued)

OTHER PUBLICATIONS

International Search Report, dated Aug. 5, 2011, from corresponding PCT application.

*Primary Examiner* — Kiley Stoner
(74) *Attorney, Agent, or Firm* — Young & Thompson

(57) ABSTRACT

An apparatus (10) for the production of brazed aluminum products on a continuous flow basis includes, in sequence, a flux application zone (12), a tunnel furnace (14), a cooling zone (15,16) and a transportation element (25) for conveying (26) component parts or products though the apparatus, the transportation element including a closed loop conveyor having both conveying (26) and return (27) runs within the tunnel furnace.

13 Claims, 4 Drawing Sheets

(56) References Cited

FOREIGN PATENT DOCUMENTS

| | | | |
|---|---|---|---|
| GB | 653432 A | | 5/1951 |
| GB | 2479553 A | | 10/2011 |
| JP | 59-197598 A | * | 11/1984 |
| JP | 61-285793 A | * | 12/1986 |
| JP | 01-262069 A | * | 10/1989 |
| JP | 3128169 A | | 5/1991 |
| JP | 4220167 A | | 8/1992 |
| JP | 6 063 733 A | | 3/1994 |
| JP | 2000309826 A | | 11/2000 |
| JP | 2001-116462 A | | 4/2001 |
| JP | 2003-332726 A | * | 11/2003 |
| JP | 2007078328 A | | 3/2007 |
| JP | 2010-251739 A | * | 11/2010 |
| KR | 100 789 363 B1 | | 1/2008 |
| RO | 94827 A | | 8/1988 |
| SU | 1790731 A3 | * | 1/1993 |

\* cited by examiner

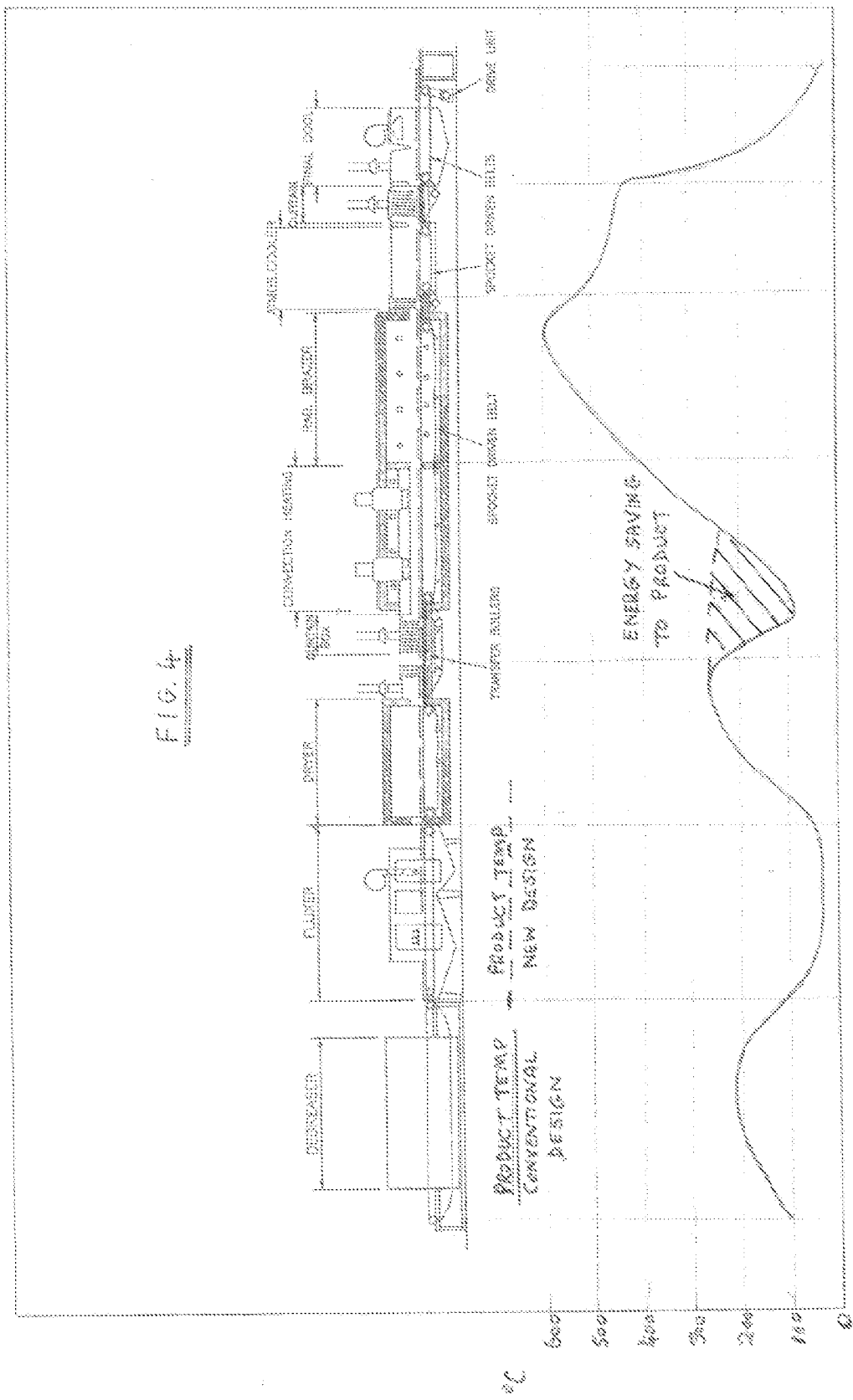

APPARATUS FOR AND METHOD OF BRAZING ALUMINIUM PRODUCTS WITH CLOSED LOOP CONVEYOR WITHIN THE FURNACE

FIELD OF THE INVENTION

This invention relates to a method of and apparatus for brazing of aluminium products.

BACKGROUND OF THE INVENTION

The invention relates in particular, though not exclusively, to the high volume, continuous production of aluminium products, such as heat exchangers and oil coolers for automotive applications. Typically a tunnel type furnace is employed for brazing together of the aluminium component parts.

Although aluminium is more difficult to braze than many other metals, the lightness of weight and good thermal conductivity of aluminium render it particularly suitable for automotive and similar applications.

In order successfully to braze aluminium it is necessary for the component parts to be de-greased and for a brazing flux to be applied, typically in the form of an aqueous suspension that is then dried prior to the component parts entering the tunnel furnace. Furthermore, in order to avoid renewed oxide formation within the furnace it is necessary to provide an inert gas, typically nitrogen, within the furnace. On exit from the heated brazing zone within the tunnel furnace the brazed product is then force cooled prior to subsequent manufacturing and finishing operations.

An example of a typical and well-proven apparatus is shown diagrammatically in FIG. 1 of the accompanying drawings. It shows in sequence a degreaser unit 1, a fluxer unit 2, a dryer unit 3, a tunnel furnace 4 comprising an entry curtain box, heating zone and atmospheric gas type cooling zone, and a final air cooling unit 5.

Each of the degreaser, fluxer and dryer units comprises a respective conveyor 6 for feeding components into the unit, transportation through the unit and removal from the unit. End rollers 7 of successive neighbouring conveyor belts are provided close together for smooth transfer of components between the units. A conveyor 8 is provided for feeding components into the entry curtain box, for transportation through the successive zones of the tunnel furnace, through the final air cooling unit and for removal from the air cooling unit. The upstream end roller of the conveyor 8 is positioned close to the downstream end of the dryer unit conveyor, again for smooth transfer of components therebetween.

SUMMARY OF THE INVENTION

Although the aforedescribed apparatus is reliable in operation, and facilitates the production of high quality aluminium heat exchangers and other such products, it requires a high energy input in order to achieve the required heating for drying and, more significantly, heating in the tunnel furnace as well as energy for forced cooling subsequent to the brazing section and on exit from the tunnel furnace.

The increasing cost of energy is a matter of concern but because of the particular advantage of aluminium over other metals such as copper and steel for the manufacture of heat exchangers and other such products there is a reluctance to construct such products from parts using materials which are more readily united. Accordingly serious consideration has not been given to re-designing the products, such as heat exchangers, to avoid the need for aluminium brazing.

An object of the present invention is to provide a method and apparatus by which the aforedescribed problems for manufacture of brazed aluminium products may be mitigated or overcome.

According to one aspect of the present invention apparatus for the production of brazed aluminium products on a continuous flow basis comprises, in sequence:—
 a flux application zone;
 a tunnel furnace;
 a cooling zone, and
 transportation means for conveying component parts or products through the apparatus,
characterised in that said transportation means comprises a closed loop conveyor having both conveying and return runs within the tunnel furnace.

According to another aspect of the present invention a method for the production of brazed aluminium products on a continuous basis comprises providing a flux application zone, a tunnel furnace, a cooling zone and transportation means for conveying products through the respective zones, wherein transportation through the tunnel furnace is by means of a conveyor having conveying and return runs within the tunnel furnace.

References herein to production on a continuous basis are intended to embrace both continuous and step wise movement of component parts and products in contrast to batch type production.

Preferably the whole of the length of each of the conveying and return runs of the conveyor belt is provided within the tunnel furnace whereby they are each wholly contained within the furnace environment. The conveyor may comprise end rollers which also are contained within the tunnel furnace environment.

Accordingly, in contrast to a conventional apparatus, the flexible support material of the conveyor is not exposed to the wide range of temperatures to which the component parts and resulting brazed products have been exposed during movement through the respective zones. Thus the invention avoids the significant expenditure and loss of energy for continually heating and cooling the conveyor belt material as it passes through the tunnel furnace and adjacent zones.

The invention provides also that preferably one or each of an upstream zone which is at above ambient temperature, such as a dryer zone, and a cooling zone downstream of the tunnel furnace shall comprise a transportation means which comprises a closed loop conveyor having both conveying and return runs within the environment of that zone. As in respect of the tunnel furnace, conveyor end rollers for a conveyor in one or each of the dryer and cooling zones preferably also are contained within the environment of that zone.

The cooling zone may be of a type known per se and which comprises two sub zones. A first sub zone, which may be in the form of a tunnel furnace extension, may be one in which those is forced gas cooling, e.g. in a nitrogen rich atmosphere, typically whilst the product lies between a first thermal curtain at the exit of the tunnel furnace and a gas seal provided between the two sub zones. In this sub zone the temperature of the product typically is reduced from a brazing temperature of approximately 600° C. (1110° F.) to a temperature of approximately 450° C. (840° F.). In the second sub zone the product is subjected to forced air-cooling to reduce the temperature to close to that of ambient temperature. Preferably separate conveyors are provided in each of said sub zones such that the flexible material of the respective conveyors does not need to cycle between the 450° C. temperature level and ambient temperature of the cooling zone.

Similarly, if the apparatus comprises a flux zone which is preceded by a de-greasing zone for removing any grease from the component parts which are to be brazed together, said de-greasing zone may comprise a conveyor having conveying and return runs both contained within the environment of the de-greasing zone.

The two or more conveyors of an apparatus in accordance with the present invention may be driven separately or a single drive unit may be provided and the drive may be transferred from the trailing roller or conveyor belt of one conveyor to the leading roller or conveyor belt of an adjacent conveyor.

Thus, for example, the conveyors may each comprise a roller having a support shaft which may extend externally of the respective zone and which carries means such as a toothed gear or chain sprocket for transfer of drive between the rollers. The conveyor belt of a conveyor typically may be of the chain driven type having transverse rods which extend outwards of the main, central section of the width of the belt and it that case the drive means for said rods may be employed for transmission of drive to an adjacent conveyor of the apparatus.

For the support of the component parts of brazed products during transfer between two conveyors the apparatus may comprise transfer rollers. The transfer rollers may be freely rotatable under the action of the component parts or product moving thereover or, particularly if the adjacent conveyors are spaced by a distance which is a significant proportion of or greater than the length of the component parts or products in the direction of movement through the apparatus, one or more transfer rollers may be of a different type, preferably driven to provide movement of component parts or products in synchronisation with movement of the conveyors. Alternatively, instead of transfer rollers, one or more conveyors may be positioned external of the units, in the ambient temperature of the environment in which the apparatus is located, for transfer of component parts and products between the tunnel furnace and an ambient temperature zone upstream or downstream of the tunnel furnace.

BRIEF DESCRIPTION OF THE DRAWINGS

One embodiment of the present invention will now be described, by way of example only, with reference to the accompanying diagrammatic drawings in which:—

DETAILED DESCRIPTION OF THE INVENTION

Figure 1:
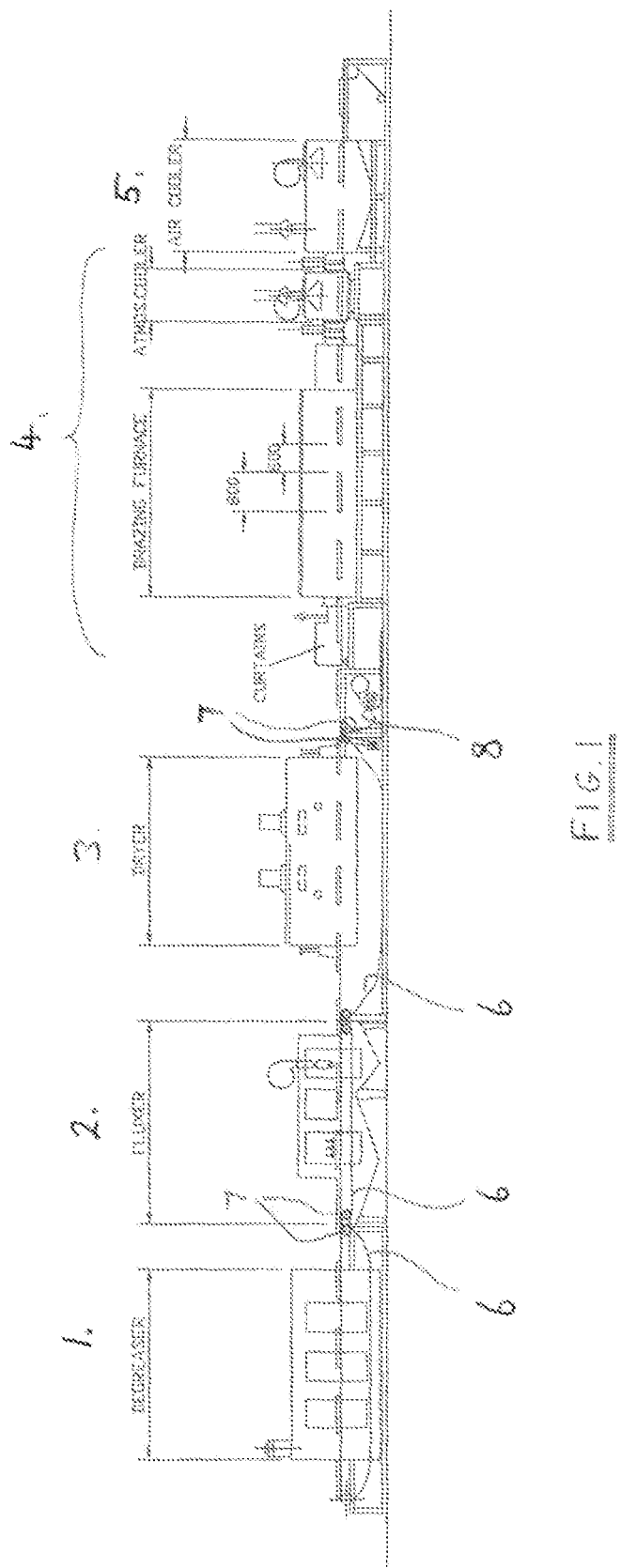
FIG. 1 is a diagrammatic view of an apparatus for brazing aluminium products.

The apparatus 10 comprises, in succession, a de-greaser unit 11, an aqueous fluxer unit 12 for application of liquid flux such as Nocolok® flux (ex Solvay Fluor Gmbh), a dryer 13, a tunnel furnace 14, a first cooling zone in the form of a furnace extension 15 and a forced air-cooling zone 16. Means is provided in a conventional manner for maintaining a nitrogen rich atmosphere within the tunnel furnace 14 and furnace extension 15.

Curtain boxes 17,18 are provided in conventional manner at the entrance to the tunnel furnace and at the exit from the furnace extension. A thermal curtain system 19 separates the heated environment of the tunnel furnace 14 from the cooling environment of the furnace extension 15. A thermal curtain 20 is provided at the exit of the dryer 13.

The tunnel furnace comprises two sections, a first section 21 for convection heating of component parts, and a second section 22 containing radiant heaters which bring the component parts to a required brazing temperature. Typically the aluminium component parts are formed from a sandwich type material comprising a core of aluminium clad, as appropriate, on either one or both sides with an alloy such as aluminium-silicon. For this alloy the radiant heaters are operated to provide a brazing temperature of between 577° C. and 610° C. (1071° F. to 1130° F.). In an alternative embodiment, not illustrated, the tunnel furnace may comprise only a single type of heating section, such as a convection heating section, particularly for alloys which have a lower brazing temperature.

For movement of component parts through the apparatus each of the de-greaser unit 11, fluxer unit 12, dryer 13, tunnel furnace 14, tunnel furnace extension 15 and cooling zone 16 is provided with a chain type mesh conveyor 25 for which both the conveying 26 and return 27 runs (see for example the illustration of the tunnel furnace zone 14) are exposed substantially only to the environmental conditions of the respective zone through which they transport the component parts/finished product. Thus the conveyor end rollers, mounted on support shafts 28, also are positioned within the respective zones.

The leading roller 31 and sprockets of the conveyor at the air-cooling zone 16 are provided with a drive unit 32. That drive is transferred from the rear, upstream roller 32 to the next conveyor 33 and in turn through to the conveyor at the de-greaser unit whereby each conveyor serves to transport component parts or product through the apparatus at a uniform speed.

Transfer rollers 35 are provided between the dryer unit and the curtain box 17 at the entrance to the tunnel furnace and are also inter-connected with the conveyors between which they are situated in a manner to provide also for uniform speed of movement of component parts. Means, not shown, is provided in a manner known per se for maintaining a nitrogen rich atmosphere in the tunnel furnace and tunnel furnace extension.

Figure 3:
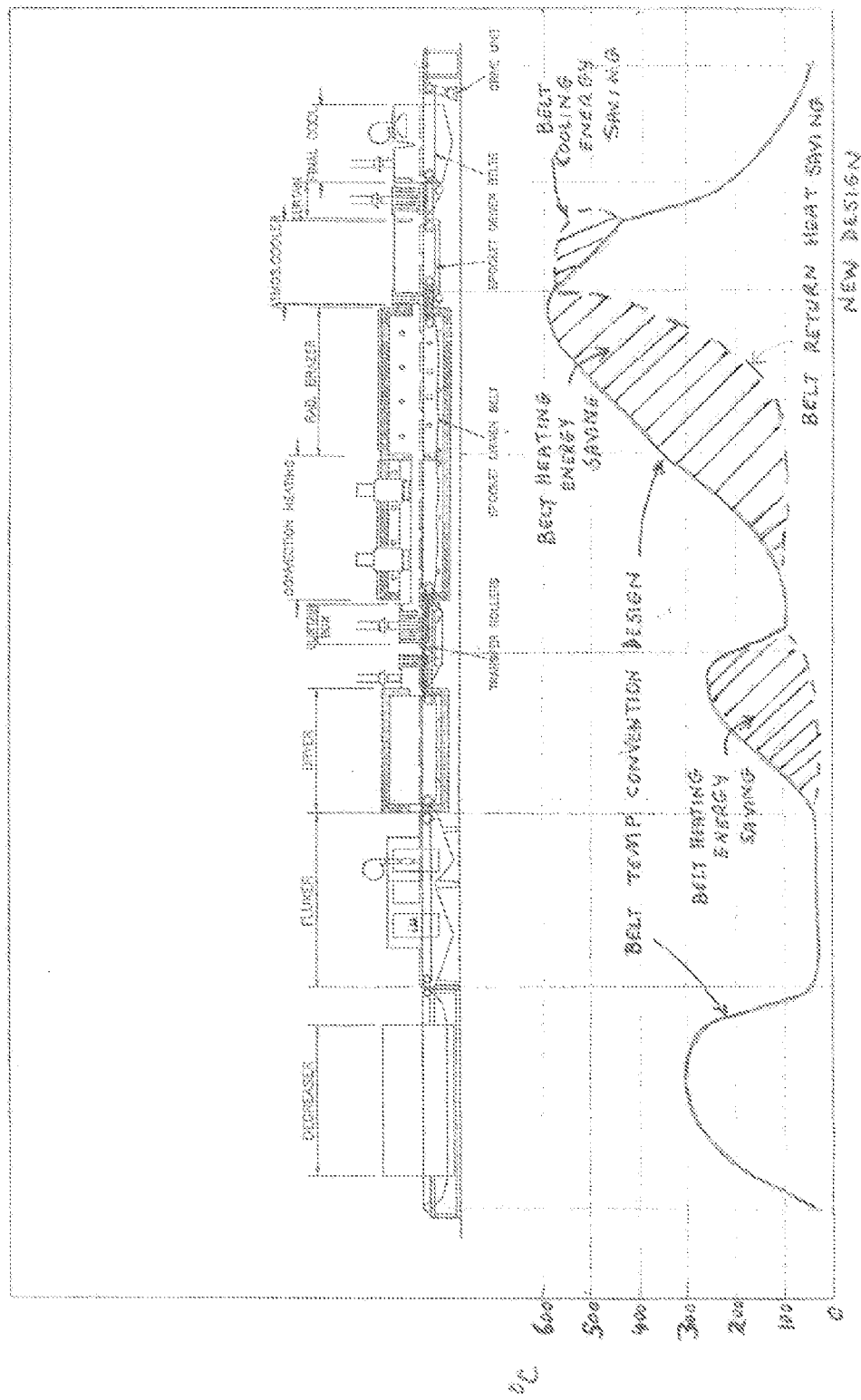
FIG. 3 corresponds with that of FIG. 2 but with the addition of conveyor belt temperature profile information, and FIG. 4 corresponds with that of FIG. 2 but with the addition of product temperature profile information

The advantageous reduction of energy loss which may be achieved by the present invention is shown by the graphs of FIGS. 3 and 4.

Figure 2:
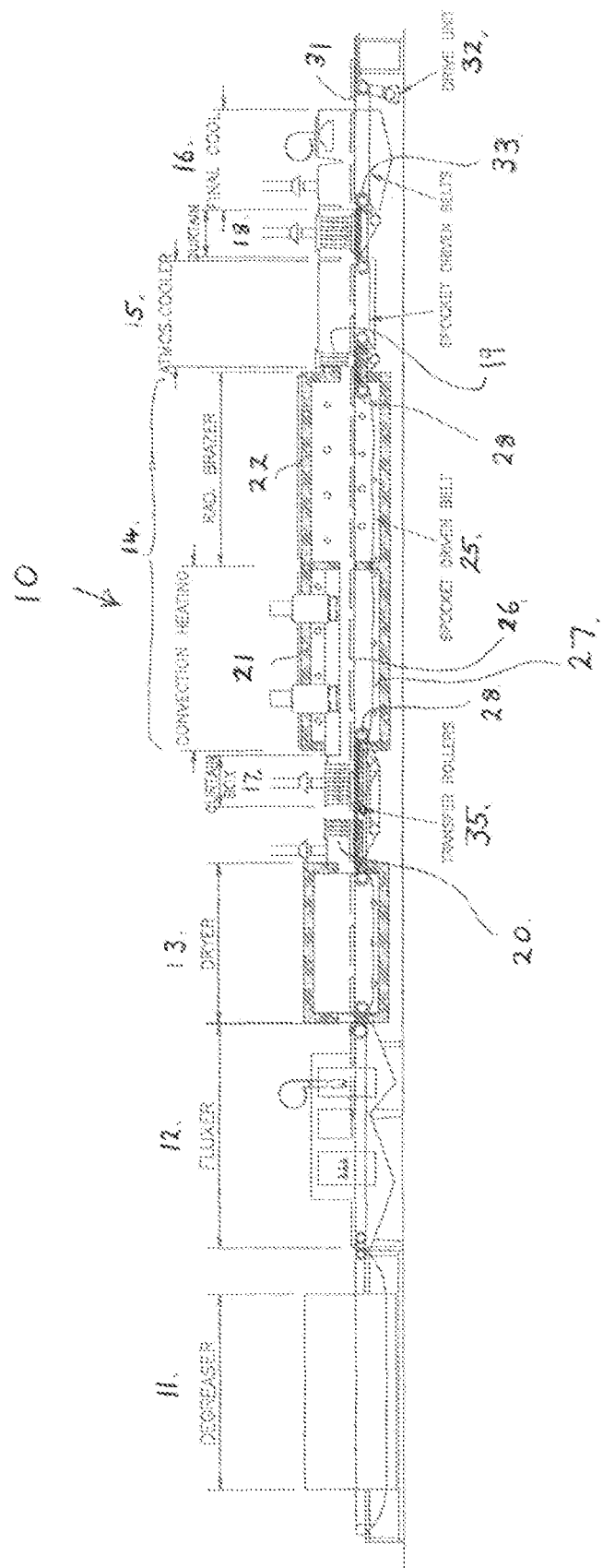
FIG. 2 is a diagrammatic view of an apparatus in accordance with the present invention.

In FIG. 3 the continuous line shows the temperature profile of the feed runs of the conveyor belts of the conventional type apparatus of FIG. 1, with the broken line showing the temperature profiles of the two belt return runs under the dryer and the furnace heating and atmospheric cooling regions. For apparatus of the present invention as shown in FIG. 2 the three belts for the dryer and the heating and cooling regions of the furnace have substantially the same temperature over both their respective feed and return runs and thus the shaded areas of the graph are indicative of the significant energy savings which may be achieved by the apparatus of the present invention.

That energy saving is supplemented by minimising heat loss from the component parts as they are transferred from the dryer to the entrance of the tunnel furnace, this being facilitated by use of internally located conveyors which avoids the need to provide sufficient space for externally positioned end rollers at the leading end of the furnace conveyor belt and downstream end of the dryer unit conveyor belt. The shaded area of the graph of FIG. 4 indicates this saving.

The invention claimed is:

1. Apparatus for the production of brazed aluminium products on a continuous flow basis comprising, in sequence:
   a flux application zone;
   a tunnel furnace;
   a cooling zone; and
   transportation means for conveying component parts or products through the apparatus,
   wherein said transportation means comprises two or more conveyors, each conveyor being a closed loop conveyor having both conveying and return runs within the tunnel furnace,
   wherein, in use, drive is transmitted from a trailing roller or conveyor belt of one conveyor to a leading roller or conveyor belt of an adjacent conveyor, and
   wherein each of said two or more conveyors comprises a roller having a support shaft which extends externally of a respective zone in which the conveyor is located and which carries means for transfer of the drive between rollers.

2. Apparatus according to claim 1 wherein a whole of a length of each of the conveying and return runs of each conveyor belt is provided within the tunnel furnace.

3. Apparatus according to claim 2 wherein each conveyor comprises end rollers that are contained within the tunnel furnace environment.

4. Apparatus according to claim 1 and comprising upstream of the tunnel furnace an upstream zone which is at above ambient temperature, said upstream zone comprising a transportation means which comprises a closed loop conveyor having both conveying and return runs within the environment of that zone.

5. Apparatus according to claim 4 wherein said closed loop conveyor at said upstream zone comprises end rollers that are contained within the environment of that zone.

6. Apparatus according to claim 1 and comprising a cooling zone downstream of the tunnel furnace, said cooling zone comprising transportation means which comprises a closed loop conveyor having both conveying and return runs within the environment of that zone.

7. Apparatus according to claim 6 wherein said cooling zone comprises a first sub-zone and a second sub-zone downstream of the first sub-zone, said first sub-zone being in the form of a tunnel furnace extension, which provides forced gas cooling of component parts or products transported through said zone.

8. Apparatus according to claim 7 wherein the second sub-zone provides for forced air-cooling of products transported there through, a gas seal being provided between the first and second sub-zones.

9. Apparatus according to claim 7 wherein separate conveyors are provided in each of said sub-zones.

10. Apparatus according to claim 1 and comprising a de-greasing zone positioned upstream of the flux application zone for removing grease from component parts, said de-greasing zone comprising a conveyor having conveying and return runs both contained within the environment of the de-greasing zone.

11. Apparatus according to claim 1 wherein each of said two or more conveyors is driven separately.

12. Apparatus according to claim 1 wherein transfer rollers are provided for movement of component parts between two adjacent conveyors, said transfer rollers being freely rotatable under the action of the component parts or products moving thereover.

13. Apparatus according to claim 1 wherein transfer rollers are provided for movement of component parts between two adjacent conveyors, said transfer rollers being driven rollers thereby to provide movement of component parts or products in synchronisation with movement of the conveyors.

* * * * *